US012626060B2

(12) United States Patent
Butler et al.

(10) Patent No.: US 12,626,060 B2

(45) Date of Patent: May 12, 2026

(54) SYSTEMS AND METHODS FOR FACILITATING TEXT ANALYSIS

(71) Applicant: Intuitive Research and Technology Corporation, Huntsville, AL (US)

(72) Inventors: JoAnna Jean Butler, Huntsville, AL (US); Casey Hatcher Cooper, Hartselle, AL (US); Jaden Kadesh Flint, Harvest, AL (US); Jason LeVoy Rogers, Meridianville, AL (US); Keith Boyd Zook, New Market, AL (US); Kyle Jordan Russell, Huntsville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 346 days.

(21) Appl. No.: 18/452,085

(22) Filed: Aug. 18, 2023

(65) Prior Publication Data

US 2024/0143918 A1 May 2, 2024

Related U.S. Application Data

(60) Provisional application No. 63/420,501, filed on Oct. 28, 2022.

(51) Int. Cl.
*G06F 40/20* (2020.01)

(52) U.S. Cl.
CPC .................................. *G06F 40/20* (2020.01)

(58) Field of Classification Search
CPC ........ G06F 40/20; G06F 40/284; G06F 40/30; G06F 40/40; G06F 40/205; G06F 16/93; G06F 16/345; G06N 3/08; G06V 30/19
See application file for complete search history.

(56) References Cited

U.S. PATENT DOCUMENTS

| | | | | |
|---|---|---|---|---|
| 9,400,778 | B2 * | 7/2016 | Ramani ................... | G06F 40/30 |
| 9,678,949 | B2 * | 6/2017 | Monk, II ............... | G06F 40/30 |
| 10,558,754 | B2 * | 2/2020 | Razack ................... | G06N 5/02 |
| 10,657,124 | B2 * | 5/2020 | Halbani ............ | G06F 16/24522 |
| 11,321,538 | B1 * | 5/2022 | Fontecilla ............. | G06F 40/284 |
| 11,657,216 | B2 * | 5/2023 | Fan .......................... | G06N 3/08 |
| | | | | 715/228 |
| 12,019,987 | B1 * | 6/2024 | Yu ........................... | G06F 40/30 |
| 12,169,500 | B1 * | 12/2024 | Sun ....................... | G06F 40/205 |
| 12,373,642 | B1 * | 7/2025 | Wang .................... | G06V 30/19 |
| 2018/0032606 | A1 * | 2/2018 | Tolman .................. | G06F 16/93 |
| 2018/0032608 | A1 * | 2/2018 | Wu ........................ | G06F 16/345 |
| 2022/0318485 | A1 * | 10/2022 | Narayanan ........... | G06F 40/205 |

(Continued)

*Primary Examiner* — Paras D Shah
*Assistant Examiner* — Nadira Sultana
(74) *Attorney, Agent, or Firm* — Workman Nydegger

(57) ABSTRACT

A system for facilitating text analysis is configurable to (i) receive input text data comprising a set of reference text and at least a first set of text, wherein the set of reference text and the first set of text each comprise structured components; process the input text data utilizing a syntax and verb usage module of a natural language processing (NLP) layer; generate a mapping of structured components of the first set of text to structured components of the set of reference text by processing output of the syntax and verb usage module utilizing a similarity analysis module or a categorization module of the NLP layer; and generate an output depicting one or more aspects of the mapping.

20 Claims, 7 Drawing Sheets

(56)                References Cited

U.S. PATENT DOCUMENTS

| | | | | |
|---|---|---|---|---|
| 2023/0043457 A1* | 2/2023 | Khan | ..................... | G06F 40/40 |
| 2023/0186667 A1* | 6/2023 | Goyal | ................. | G06F 40/205 |
| | | | | 382/181 |

* cited by examiner

| Document 1 Component Name | Document 1 Component Description | Confidence Level | Normalized Score | Document 2 Component Name | Document 2 Component Description | Reject? |
|---|---|---|---|---|---|---|
| SyRS-2.0 | The software shall be launched via an executable file. | High | 1 | SoRS-95 | The software shall be launched from a single executable file. | Reject |
| | | | 0.437180132 | SoRS-280 | When the application is launched, the default Virtual Environment shall be displayed. | Reject |
| | | | 0.23154597 | SoRS-102 | The software shall dynamically create a stack of 2D images per scan sequence in a dataset. | Reject |
| | | | 0.177171782 | SoRS-173 | The Software shall only read files from a CD/DVD-ROM. | Reject |
| | | | 0.015705807 | SoRS-115 | The software shall be named "Software". | Reject |
| SyRS-5.0 | VR must be installed on the user's computer for the software system to function correctly. | Low | 1 | SoRS-89.1 | A display panel shall be converted into a 3D representation of a computer tablet displaying the imagery. | Reject |
| | | | 0.341999233 | SoRS-164 | The software shall be implemented to meet the minimum system requirements for the target system. | Reject |
| | | | 0.126030713 | SoRS-115 | The software shall be named "Software". | Reject |
| | | | 0.079335958 | SoRS-97 | The software version shall be 1.0. | Reject |
| | | | 0.064482234 | SoRS-189 | The software shall allow the user to target an object in the virtual space using the VR headset. | Reject |

| Document 1 Component Name | Document 1 Component Description | Confidence Level | High Score Count | Moderate Score Count | Low Score Count |
|---|---|---|---|---|---|
| SyRS-2.0 | The software shall be launched via an executable file. | High | 1 | 1 | 204 |
| SyRS-5.0 | VR must be installed on the user's computer for the software system to function correctly. | Low | 1 | 0 | 205 |

Artificial Intelligence in Healthcare

Introduction

Artificial Intelligence (AI) is a rapidly evolving technology that holds immense potential for transforming the healthcare industry. Through the utilization of advanced algorithms and machine learning techniques, AI has the capability to revolutionize healthcare delivery, enhance patient outcomes, and optimize operational efficiency.

Diagnostics and Medical Imaging

AI algorithms can analyze patient data and symptoms to provide automated diagnostic recommendations with high accuracy. By analyzing large volumes of patient data, AI can aid in the early detection of diseases such as cancer or cardiovascular conditions.

Drug Discovery and Development

AI algorithms can sift through vast databases of chemical compounds to identify potential drug candidates, accelerating the drug discovery process. AI can analyze complex biological data to predict the efficacy and safety of drug candidates, aiding in the development of new treatments. AI algorithms can analyze patient-specific data to tailor treatments based on genetic factors, lifestyle, and medical history.

Clinical Decision Support Systems

AI algorithms can assess patient data to identify individuals at high risk for certain conditions, enabling proactive interventions and personalized care plans. AI systems can analyze patient data, medical literature, and clinical guidelines to provide evidence-based treatment recommendations to healthcare professionals. AI-powered systems can continuously analyze patient data from wearables, sensors, and electronic health records to monitor health status and detect early warning signs. AI-powered systems can analyze medical images such as X-rays, MRIs, and CT scans to detect abnormalities and assist radiologists in making diagnoses.

404

| Relevant Section: "Diagnostics and Medical Imaging" | Confidence Level: High | Reject |
| --- | --- | --- |

SYSTEMS AND METHODS FOR FACILITATING TEXT ANALYSIS

CROSS-REFERENCE TO RELATED APPLICATIONS

This application claims priority to U.S. Provisional Patent Application No. 63/420,501, filed on Oct. 28, 2022, and entitled "SYSTEMS AND METHODS FOR FACILITATING TEXT ANALYSIS," the entirety of which is incorporated herein by reference.

BACKGROUND

With recent technological advancements, electronic storage of data is ubiquitous and readily utilizable by individuals and enterprises/organizations. The accessibility/usability of electronic data storage has given rise to the use/occurrence of voluminous bodies of electronically stored text data in various contexts. Consequently, many individuals/entities are expected to analyze, interpret, implement, or otherwise interact with and/or act upon large quantities of electronically stored text data. Such interactions with large quantities of text data can occur in various endeavors, such as technological, commercial, regulatory/legal, research, and/or other endeavors.

However, interacting with and/or acting upon large quantities of text data is associated with many challenges, such as being time-consuming and/or complex, which can give rise to errors. Furthermore, in many instances, multiple individuals/entities collaborate to interact with and/or act upon one or more bodies of text data. Different individuals/entities typically have different perspectives, paradigms, and/or biases that can give rise to inconsistent and/or unpredictable results from analysis of the same body of text data.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2, 3, and 4 illustrate example conceptual representations of output generated by a text analysis system, in accordance with implementations of the present disclosure.

DETAILED DESCRIPTION

Figure 1:
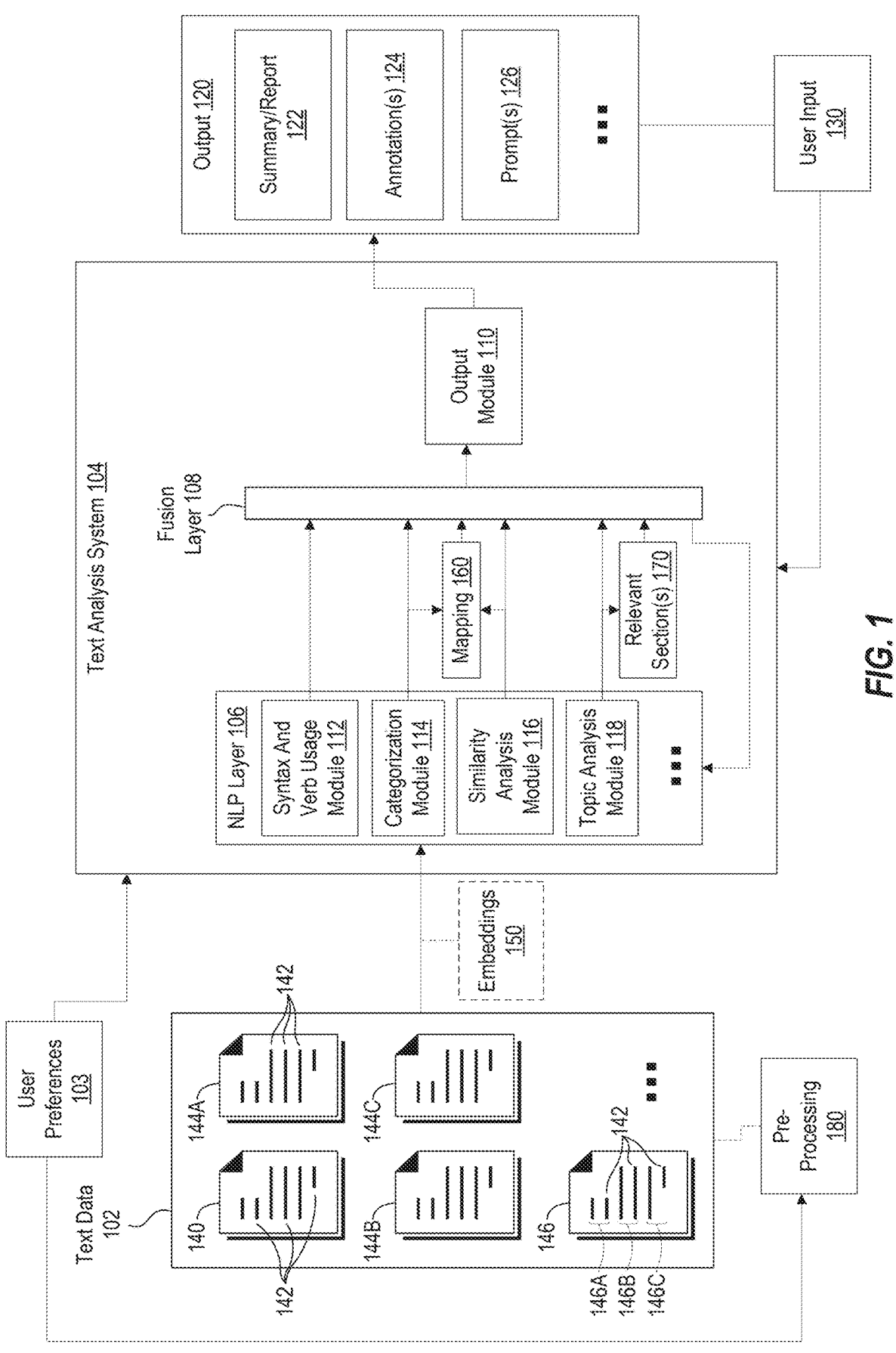
FIG. 1 illustrates example components of a text analysis system, in accordance with implementations of the present disclosure.

Disclosed embodiments are directed to systems, methods, devices, and/or techniques for facilitating text analysis. As noted above, interacting with and/or acting upon one or more large bodies of text data is associated with many challenges. For example, in the domain of model-based systems engineering (MB SE), systems are often associated with a high level of complexity, with numerous requirements (e.g., on the level of thousands, which can relate to performance characteristics, functions, structure/physical architecture, etc.), interfaces, documentation, etc. Conventionally, systems engineers manually examine documents that detail myriad system requirements and manually categorize the requirements (e.g., into functional and non-functional categories) and trace the requirements to physical and/or functional architecture. Such manual analysis of large bodies of systems requirements can give rise to human errors and can amount to an arduous and time-consuming process.

As another example, in the domain of litigation discovery, the aforementioned ubiquity of electronically stored data has given rise to an increase in the scope of text data that is potentially relevant to legal disputes (e.g., electronic communications, internal documents, social media content, etc.). Thus, litigants responding to discovery requests and/or receiving discovery materials often have significant amounts of text data to examine for relevance. Conventionally, law practitioners manually examine documents to sift out irrelevant information and find relevant information in a case-specific manner.

Natural language processing (NLP) techniques implement artificial intelligence (AI) and/or machine learning (ML) technologies to configure algorithms to analyze written human languages. NLP modules are useful for performing particular interpretive tasks with respect to text data, such as determining the meaning, sentiment, and/or connotation of words and/or phrases. Conventional NLP techniques, however, are limited in their usability for analyzing large and/or complex bodies of text to facilitate and/or inform practical applications based on the body of text.

At least some disclosed embodiments of the present disclosure are directed to a text analysis system that includes an NLP layer, a fusion layer, and an output module. The NLP layer may include various types of NLP modules configured for performing different NLP tasks, such as, by way of non-limiting example, categorization, topic analysis, syntax and verb usage analysis, and/or similarity analysis. The fusion layer may comprise interconnections among the NLP modules of the NLP layer and/or may comprise additional AI modules for aggregating, combining, and/or interpreting output from modules of the NLP layer. The output module may be configured to generate a human-consumable output, such as a graphical user interface (GUI), a report, a prompt/workflow, and/or other output that assists an entity in implementing/utilizing the output of the text analysis system.

At least some disclosed embodiments are directed to a system configured to receive input text data that includes a set of reference text and one or more additional sets of text. The set of reference text and the additional set(s) of text include structured components, such as sentences or other groupings of text. The system may be configured to process the input text utilizing various modules of an NLP layer. For instance, the system may process the input text utilizing a syntax and verb usage module (e.g., to provide output indicating the meanings of words based on sentence structure, groupings, and/or relationships among words, etc.).

The system may process the output of the syntax and verb usage module utilizing a mapping module (e.g., a categorization module or a similarity analysis module) of the NLP layer to generate a mapping of structured components of the additional set(s) of text to structured components of the set of reference text. The mapping may indicate sentences (or other structured components) of the additional set(s) of text that are similar and/or relevant to corresponding sentences (or other structured components) of the set of reference text. Various types of output may be constructed based upon the mapping, such as a report that indicates the locations, content, and/or quantity of structured components within the set of additional text that are mapped to particular structured components of the set of reference text.

Such functionality may be usable in various types of implementations. For instance, in the domain of systems engineering or MB SE, a set of reference text may comprise a set of requirements documents, and the additional set(s) of text may include vendor specifications for multiple vendors. The system may process the set of requirements documents and the vendor specifications to generate a mapping of parts of the vendor specifications to particular requirements of the set of requirements documents. The mapping may be used to generate an output that can assist users in determining which vendor specifications comply with the requirements detailed in the set of requirements documents. In some instances, output generated based on the mapping may indicate confidence associated with the mapping labels assigned by the system. In some implementations, users may accept or reject mapping labels provided by the system, and such user input may be utilized to further train/tune components of the system (e.g., modules of the NLP layer).

At least some disclosed embodiments are directed to a system configured to receive input text data that includes various sections, where each section has a plurality of structured components (e.g., sentences, or other groupings of text). The system may be configured to process the input text utilizing various modules of an NLP layer. For instance, the system may process the input text utilizing a syntax and verb usage module (e.g., to provide output indicating the meanings of words based on sentence structure, groupings, and/or relationships among words, etc.). The system may process output of the syntax and verb usage module utilizing a topic analysis module to determine a topic for each sentence (or other structured component) of the input text. A topic for a sentence (or other structured components) may comprise a ranked list of words from the sentence that indicate/suggest the pertinence or relevance of the sentence. Topics for particular sentences of the input text may be compared to other topics or to topic sets associated with the various sections present in the input text. A topic set for a section may comprise a topic constructed from or based on the topics of the constituent sentences (or other structured components) that form the section. For a particular sentence (or other structured component) of the input text, the system may be configured to determine a relevant section by comparing the topic for the particular sentence to other topics or to topic sets associated with the various sections of the input text. An output may be constructed indicating the relevant section for the particular sentence (or another structured component).

Such functionality may be usable in various types of implementations. For example, many types of documents experience edits, additions, reorganizations, and/or modifications over time. In some instances, such modifications to documents may cause sentences (or other subject matter) to become misplaced or placed in a section (e.g., under a heading) that is not relevant to the sentences. Processing such documents as discussed above to generate relevant topics may provide an output indicating recommended sections (e.g., headings, or other placement within the document) for one or more sentences (or other structured components) of such documents. Users may utilize such recommendations to move sentences (or other structured components) to appropriate sections within the document, thereby providing a document with improved section organization. In some instances, the output provides selectable elements or other functionality to facilitate automatic migration of text to its relevant section within the document. In some implementations, users may accept or reject relevant section designations provided by the system, and such user input may be utilized to further train/tune components of the system (e.g., modules of the NLP layer).

Implementation of at least some of the principles described herein may facilitate various benefits, particularly with regard to facilitating analysis of large collections of text data. For example, a text analysis system as described herein may reduce the amount of time (and/or cost in professional time) necessary to interpret a body of text documents. For instance, disclosed systems may facilitate rapid and efficient analysis of text (or other data, such as activity diagrams) detailing system requirements to enable categorization and/or interpretation of the requirements. The system may generate a human-interpretable or human-consumable output (e.g., a report) that can assist users in determining compliance of a proposed specification with requirements, selecting from among alternative proposed specifications, building compliant systems, improving organization of content within documents, etc.

A text analysis system as described herein may mitigate errors and/or omissions associated with text analysis, which may facilitate avoidance of downstream costs that might result from undetected errors. In some implementations, a text analysis system according to the present disclosure is able to provide consistent results (e.g., in contrast with utilizing multiple human evaluators, where each human evaluator would have different biases/paradigms/expertise) while being adaptable/tunable over time based upon user preferences/inputs (e.g., a user may correct/modify labeling/classification output by the text analysis system, which may be used to further train the text analysis system). In some instances, a text analysis system according to the present disclosure may be utilized as an initial evaluator (e.g., prior to human evaluation of input text data) and/or as a second evaluator (e.g., to supplement human evaluation of input text data).

Although the present description focuses, in at least some respects, on particular example use cases of a text analysis system according to the present disclosure (e.g., systems engineering, litigation discovery), a text analysis system, as described herein, may be utilized in other contexts.

Having just described some of the various high-level features and benefits of the disclosed embodiments, attention will now be directed to FIGS. 1 through 7, which illustrate various conceptual representations, architectures, methods, and/or supporting illustrations related to the disclosed embodiments.

Example Text Analysis System

FIG. 1 illustrates example aspects and functionalities of a text analysis system 104, in accordance with implementations of the present disclosure. In the example of FIG. 1, the text analysis system 104 is configured to process text data 102 and to provide output 120. The text data 102 may take on various forms, such as electronic documents, electronic communications (e.g., chat/text messages, emails, etc.), transcriptions, optical character recognition (OCR) output, website content, etc. Text data 102 for processing by the text analysis system 104 may originate from any suitable source(s) and may be stored in any suitable manner (e.g., as a single electronic file, or multiple electronic files). For example, in MBSE use cases, the text data 102 may include a collection of documents detailing system performance and/or output requirements, performance specifications, applicable laws/regulations/standards associated with the system and/or its operational environment, stakeholder and/or engineer notes/comments/preferences, and/or others. As another example, in law use cases, the text data 102 may include a collection of documents provided by a litigant responsive to a discovery request, a body of potentially relevant documents and/or communications from which text may be selected to respond to a discovery request, a corpus of regulatory documents, legislative documents, court documents, and/or other legal documents, and/or others. In policy compliance use cases, the text data 102 may include a set of policy/procedure, standard, regulatory, and/or other documents. Other types of text data 102 that may be utilized may include risk assessments, findings (e.g., audit findings), system architecture requirements documents, capability development documents, etc. In view of the foregoing examples, numerous types and/or formats of text data 102 may be processed by a text analysis system 104. In this regard, a text analysis system 104 may process the text data 102 in a data-agnostic manner.

FIG. 1 indicates that the text data 102 may comprise various types and/or sets of text (e.g., in the form of documents or sets of documents). For example, FIG. 1 depicts the input text 102 as including a set of reference text 140 (represented by a set of documents) and additional sets of text (e.g., first set of text 144A, second set of text 144B, and third set of text 144C). The various sets of text included in the text data 102 may comprise structured components 142, which may take the form of sentences or other groupings of text. As discussed herein, the text analysis system 104 may facilitate mapping of structured components 142 of one or more sets of text (e.g., the first set of text 144A, the second set of text 144B, and/or third set of text 144C) to structured components 142 of a set of reference text 140 of the text data 102.

FIG. 1 also indicates that the text data 102 may comprise one or more sets of text 146 that include one or more sections (e.g., sections 146A, 146B, 146C, etc.) that may include structured components 142. As discussed herein, the text analysis system 104 may facilitate determination of relevant sections for particular structured components 142 of the set(s) of text 146 of the text data 102. The ellipsis within the text data 102 of FIG. 1 indicates that the text data 102 may comprise various types and/or quantities of text that include structured components 142.

FIG. 1 depicts pre-processing 180 that may be performed to obtain or process the text data 102 to put the text data 102 into a form or format that is usable by the text analysis system 104 to perform the functions described herein. In some instances, the pre-processing 180 is performed on raw data (e.g., raw text, text documents, image data) to generate the text data 102. The pre-processing 180 may include various types of operations, such as, by way of non-limiting example, lemmatization, lowercase conversion, document conversion, document reformatting, optical character recognition, and/or others. For instance, pre-processing 180 may be performed to convert one or more activity diagrams into one or more sets of sentences (or other grouped words) to provide text data 102 for processing by the text analysis system 104.

FIG. 1 furthermore illustrates user preferences 103, which may influence the manner in which the text analysis system 104 processes the text data 102 and/or the output 120 generated by the text analysis system 104 based upon the text data 102 (additional details related to the output 120 will be provided hereinafter). For instance, the user preferences 103 may be based upon user input and/or may define constraints, parameters, input type, and/or output type for the text analysis system 104. As an initial example, the user preferences 103 may indicate the domain and/or use case for which the text analysis system 104 will be utilized for a particular text processing task (e.g., MBSE, litigation, etc.). By way of further example, in a litigation context, a user may define user preferences 103 that indicate that the text data 102 to be processed by the text analysis system 104 includes a collection of documents provided by an opposing party pursuant to litigation discovery, or that the text data 102 to be processed by the text analysis system 104 includes a corpus of documents and/or communications of an enterprise required to respond to a discovery request. As another example, user preferences 103 may indicate one or more claims, defenses, and/or other issues/aspects of litigation (e.g., key dates, key occurrences, key entities, etc.). Such user preferences 103 may influence the processing of the text data 102 by the text analysis module 104 (e.g., by influencing the NLP modules of the NLP layer 106 to be utilized, by influencing categories for the categorization module 114 and/or topics for the topic analysis module 118, etc.). As yet another example, the user preferences 103 may determine whether the output 120 of the text analysis system 104 will comprise a summary/report 122, annotation(s) 124 on the text data 102, etc., and may determine various aspects or configurations (e.g., formatting/structuring) for the output 120. The user preferences may determine which modules of the NLP layer 106 of the text analysis system 104 to utilize and/or may indicate configurations for the utilization of the modules (e.g., whether to utilize a topic analysis module 118 prior to utilizing a syntax and verb usage module 112 or a categorization module 114 to determine a mapping).

The user preferences 103 may additionally or alternatively be utilized to determine what type of pre-processing 180 to perform to generate and/or process the text data 102. For instance, the user preferences 103 may indicate characteristics (e.g., type, formatting, taxonomy) of raw input data (e.g., image data, document data) that may be processed to generate the text data 102. Based on the user preferences 103, a system may determine various modules to employ or operations to perform to convert the raw input data into the text data 102.

In the example of FIG. 1, the text analysis system 104 includes an NLP layer 106, which includes various NLP modules. The NLP layer 106 of FIG. 1 includes at least a syntax and verb usage module 112, a categorization module 114, a similarity analysis module 116, and a topic analysis module 118 (additional, alternative, or fewer modules may be included, as indicated by the ellipsis associated with the NLP layer 106). In some instances, one or more modules of the NLP layer 106 are generated by training/tuning a base NLP model for one or more particular domains and/or use cases. As noted above, the particular NLP modules of the NLP layer 106 (and/or parameters/constraints thereof) to be utilized by the text analysis system 104 for a particular text analysis task may be selected at least partially based upon particular user preferences 103 associated with the particular text analysis task.

The syntax and verb usage module 112 of the NLP layer 106 of the text analysis system 104 may comprise a syntactic analysis parser and/or semantic analysis model configured to determine the structure of sentences and/or groups of words to determine their meaning (e.g., to evaluate verb usage and/or the relationships among words). By way of non-limiting example, a syntax and verb usage module 112 may comprise and/or implement a recursive descent parser, a shift-reduce parse, a chart parser, a regexp parser, any top-down or bottom-up parsing method, and/or other architectures or techniques.

In the example of FIG. 1, the categorization module 114 of the NLP layer 106 of the text analysis system 104 may comprise a text classification module (or algorithm) configured to classify or categorize text into predefined groups. By way of non-limiting example, a categorization module 114 may comprise and/or implement a support vector machine (SVM), a naïve Bayes classifier, extreme gradient boosting (XGBOOST), k nearest neighbor (KNN), and/or others. In some implementations, the categorization module 114 is configured to utilize embeddings 150 obtained from the text data 102 to categorize the text data 102. The predefined groups associated with the categorization module 114 may be determined/selected based upon one or more parts of the text data 102 (e.g., the set of reference text 140) and/or user preferences 103 (e.g., for particular use cases). For example, the categorization module 114 may learn categories using the structured components 142 of the set of reference text 140 and may then categorize the structured components 142 of the additional set(s) of text (e.g., the first set of text 144A, the second set of text 144B, or the third set of text 144C) into the learned categories, thereby resulting in a mapping 160 of the structured components 142 of the additional set(s) of text to the structured components 142 of the set of reference text 140.

The similarity analysis module 116 of the NLP layer 106 of the text analysis system 104 may comprise one or more models or algorithms configured to represent text with vectors in vector space (e.g., by utilizing a similarity matrix, non-negative matrix factorization, term frequency-inverse document frequency (TF-IDF), word2vec, doc2vec, transformers, and/or others) and determine similarities between the vectors (e.g., using cosine similarity, Euclidean distance, and/or other similarity techniques). For instance, the similarity analysis module 116 may comprise or implement latent semantic indexing (LSI) to facilitate similarity analysis. By way of example, a similarity analysis module 116 may compare vectors or embeddings of the structured components 142 of the set of reference text 140 to the vectors or embeddings 150 of the structured components of the additional set(s) of text (e.g., the first set of text 144A, the second set of text 144B, or the third set of text 144C) to determine a mapping 160 of the structured components 142 of the additional set(s) of text to the structured components 142 of the set of reference text 140. The mapping 160 may be based on ranked similarity of the vectors or embeddings of the structured components 142 of the different sets of text.

FIG. 1 depicts both the categorization module 114 and the similarity analysis module 116 as being capable of generating a mapping 160 of structured components 142 in one set of text (e.g., the first, second, and/or third set of text 144A, 144B, and/or 144C, respectively) to structured components 142 in another set of text (e.g., the reference set of text 140). In this sense, the categorization module 114 and the similarity analysis module 116 may be regarded as mapping modules. In some implementations, only one of the categorization module 114 or the similarity analysis module 116 is utilized to generate the mapping 160, whereas in other instances both the categorization module 114 and the similarity analysis module 116 are utilized to generate the mapping 160 (e.g., with their mapping output being aggregated, combined, or selected from via the fusion layer 108 to provide a final mapping).

The topic analysis module 118 of the NLP layer 106 of the text analysis system 104 may comprise a topic modeling module (or algorithm) that detects patterns to cluster word groupings and/or related expressions to represent the input group of words or structured component (e.g., with a generalized or abstracted label for the set of input text). In some instances, a topic for an input group of words that is output by the topic analysis module 118 may comprise a ranked list of words from the input group of words that indicate the potential pertinence or relevance of the input group of words. By way of non-limiting example, a topic analysis module 118 may comprise and/or implement latent Dirichlet allocation (LDA), parallel latent Dirichlet allocation, non-negative matrix factorization (NMF), pachinko allocation model (PAM), and/or others. In some instances, the topic analysis module 118 is implemented as a topic classification module (or algorithm) trained using supervised learning techniques (e.g., in a domain-specific manner). In some instances, topic classes associated with the topic analysis module 118 may be based on user preferences 103.

As indicated above, a particular topic may be determined via the topic analysis module 118 for a particular structured component 142 of a set of text 146 of the text data 102. The particular topic (or at least part of the particular topic, such as one or more highest ranked words) may be compared to topics or topic sets associated with different sections 146A, 146B, and/or 146C of the set of text 146. A topic set for a section may be based on the topics of structured components within the section, such as by sampling from the topics of the section (e.g., iterative or random sampling), selection of the highest N ranked words from topics in the section, etc. The comparison of the particular topic with the topics or topic sets of the different sections 146A, 146B, and/or 146C may indicate relatedness or similarity between the particular topic and the topics or topic sets of the different sections 146A, 146B, and/or 146C. The relatedness or similarity may indicate relevant section(s) 170 for the particular topic and/or the particular structured component 142 (e.g., the section(s) with the highest relatedness or similarity to the particular topic).

FIG. 1 conceptually depicts the text data 102 being provided as input to the text analysis system 104, in particular to the NLP layer 106 of the text analysis system 104 (e.g., as indicated in FIG. 1 by the arrow extending from the text data 102 to the NLP layer 106). One or more of the NLP modules of the NLP layer 106 may process the text data 102 to provide output (e.g., in the form of labels, classifications/categorizations, etc.), and such output may be received or routed through a fusion layer 108 (as indicated in FIG. 1 by the arrows extending from the NLP modules of the NLP layer 106 to the fusion layer 108). In some implementations, the fusion layer 108 comprises a communication layer that interconnects the NLP modules of the NLP layer 106 to enable them to operate in a collaborative or complementary manner. For instance, the fusion layer 108 may facilitate message passing or other communication among the NLP modules of the NLP layer 106 to enable outputs (and/or intermediate representations, such as embeddings) generated by the various NLP modules to be considered and/or utilized by other NLP modules of the NLP layer 106 (as indicated in FIG. 1 by the arrow extending from the fusion layer 108 to the NLP layer 106). In this regard, at least some NLP modules of the NLP layer 106 may process the text data 102 in parallel, and/or at least some NLP modules of the NLP layer 106 may perform sequential processes (e.g., utilizing output or intermediate representations of other NLP modules). In some instances, the fusion layer 108 passes the output of the NLP layer 106 to the output module 110 without transforming or re-routing the output of the NLP layer 106.

In the example of FIG. 1, final output provided by the various NLP modules of the NLP layer 106 may be combined, fused, or passed by the fusion layer 108 (which may comprise one or more AI modules) and provided to the output module 110. The output module 110 is configured to generate an output 120 based upon the labels/classifications/inferences provided by the NLP layer 106 and fusion layer 108. As noted above, in some instances, the output module 110 may be further configured to generate the output 120 based upon the user preferences 103. In some instances, the output 120 is configured to provide a summary and/or emphasis of relevant portions of the text data 102 in a human-consumable format. In some instances, the output 120 is configured to provide metrics associated with the interpretation of the text data 102 by the text analysis system 104, such as confidence metrics associated with the labels output by the text analysis system 104. For example, the output 120 may include a confidence measure associated with a categorization of a requirement provided by the categorization module 114.

By way of illustrative example, the text analysis system 104 of FIG. 1 may receive input text data 102 that includes a set of reference text 140 and one or more additional sets of text (e.g., the first, second, and/or third set of text 144A, 144B, and/or 144C) that each include structured components 142 (e.g., sentences). The input text data 102 may be generated via pre-processing 180. The text analysis system 104 may process the input text data 102 utilizing the syntax and verb usage module 112 of the NLP layer 106. The output of the syntax and verb usage module 112 may be utilized as input to the categorization module 114 and/or the similarity analysis module 116 (e.g., via the fusion layer 108) to generate a mapping 160 of the structured components 142 of the one or more additional sets of text (e.g., the first, second, and/or third set of text 144A, 144B, and/or 144C) to the structured components 142 of the set of reference text 140. In some instances, output of both the categorization module 114 and the similarity analysis module 116 are combined to obtain the mapping 160. The mapping 160 may be provided to the output module 110 (e.g., via the fusion layer 108), and the output module 110 may generate output 120 based on the mapping 160 for presentation to a user. The mapping 160 may comprise separate components or separate mappings associated with each of the different additional sets of text that are mapped to the set of reference text 140. For instance, the mapping 160 may comprise a first mapping that maps the first set of text 144A to the set of reference text 140, a second mapping that maps the second set of text 144B to the set of reference text 140, and/or a third mapping that maps the third set of text 144C to the set of reference text 140.

In one example, the structured components 142 of the set of reference text 140 may indicate requirements detailed by one or more requirements documents (e.g., system requirements in a systems engineering context), and the structured components 142 of the one or more additional sets of text may indicate specifications detailed by one or more specification documents (e.g., vendor specifications). The mapping 160 may comprise a mapping of the specifications to the requirements to indicate whether the specifications are likely to satisfy the requirements.

In some instances, the output of the syntax and verb usage module 112 is processed via the topic analysis module 118, and the output of the topic analysis module 118 is then processed by the categorization module 114 and/or the similarity analysis module 116 to generate the mapping 160. For example, the reference text 140 and/or the one or more additional sets of text may comprise voluminous quantities of text, which can hinder the interpretability and/or usability of the mapping 160 as represented in the output 120 when the mapping 160 is generated based on the immediate output of the syntax and verb usage module 112. By performing topic analysis via the topic analysis module 118, and by generating the mapping 160 based on the topic output, the output 120 based on the mapping 160 may be simplified. Topic analysis may be utilized in conjunction with the categorization module 114 and/or the similarity analysis module 116 to generate the mapping 160 as discussed above based on the user preferences 103 and/or based on characteristics of the input text data 102 (e.g., in response to determining that one or more documents of the input text data 102 satisfy one or more document size thresholds).

As another illustrative example, the text analysis system 104 may receive input text data 102 that includes sections (e.g., sections 146A, 146B, and 146C of set of text 146) that each include structured components 142 (e.g., sentences). The input text data 102 may be generated via pre-processing 180. The text analysis system 104 may process the input text data 102 utilizing the syntax and verb usage module 112 of the NLP layer 106. The output of the syntax and verb usage module 112 may be utilized as input to the topic analysis module 118 (e.g., via the fusion layer 108) to generate a topic for each structured component 142 of the input text data 102. The text analysis system 104 may determine topic sets for each of the sections (e.g., sections 146A, 146B, and 146C) using the topics for the structured components 142 within the sections. For at least one particular structured component 142 of the input text data 102, the text analysis system 104 may compare the corresponding topic of the particular structured component 142 to the topic sets associated with the different sections of the input text data 102 to determine relevant section(s) 170 for the particular structured component 142. For example, the text analysis system 104 may compare the corresponding topic to a sampling of topics associated with a particular section or to the N highest ranked words associated with the particular section to determine similarity between the particular structured component 142 and the particular section. In some instances, when comparing the corresponding topic for the particular structured component 142 to the topics or topic set of the corresponding section of which the particular structured component 142 is a part in the input text data 102, the topics or topic set defined for the corresponding section omits the corresponding topic for the particular structured component 142. Such a comparison may be performed between the corresponding topic and topics or topic sets associated with each section of the input text data 102 to determine the section(s) with the highest similarity to the corresponding topic (e.g., to determine ranked similarities). The relevant section(s) 170 for the particular structured component 142 may be defined based on the determined similarity between the corresponding topic and the topics or topic sets associated with the different sections of the input text data 102.

Relevant section(s) 170 may be determined for any quantity of structured components 142 of the input text data 102. The relevant section(s) 170 may be provided to the output module 110 (e.g., via the fusion layer 108), and the output module 110 may generate output 120 based on the relevant section(s) 170 for presentation to a user.

In some instances, the relevant section(s) 170 for a particular structured component 142 comprises the section of which the particular structured component 142 is already a part. In some instances, the text analysis system 104 generates output 120 indicating the relevant section(s) 170 for a particular structured component 142 in response to determining that the relevant section(s) 170 for the particular structured component 142 is different from the section of which the particular structured component 142 is already a part in the input text data 102.

The syntax and verb usage module 112 may perform various functions in various use cases. For instance, in the case of MBSE, the syntax and verb usage module 112 may be configured to analyze groups of words based upon their compliance with a particular standard or taxonomy (e.g., easy approach to requirements syntax (EARS)) or structural convention associated with system requirements. For instance, the compliance of groups of words with a particular standard or taxonomy may indicate that the group of words indicates requirements for a system (e.g., thereby influencing interpretation and/or processing of the group of words by the text analysis system 104). As another example, in the case of litigation, the syntax and verb usage module 112 may analyze groups of words based on the use of action words or verbs therein to facilitate detection of actions, occurrences, and/or communications that are relevant to a case or controversy (e.g., relevant to one or more claims, defenses, and/or issues of a legal dispute).

The categorization module 114 may perform various functions in various use cases. For example, in the case of MBSE, the categorization module 114 may be configured to classify requirements from the text data 102 into relevant categories (e.g., performance requirements, functional requirements, etc.). In some instances, the categorization module 114 is configured to distinguish between qualitative requirements and quantitative requirements to characterize system requirements. For instance, a requirement indicating that a system is to include a particular characteristic (e.g., to be configured to provide a particular output) may be labeled as qualitative, and a requirement indicating metrics/ranges associated with a particular characteristic may be labeled as quantitative (e.g., that the system be configured to provide the particular output within a certain time period).

As another example, in the case of litigation discovery, the categorization module 114 may be configured to classify different types of text information, such as communications (e.g., emails, texts, etc., which may be classified based upon parties to the communication), procedures, reports, etc. In some instances, the categorization module 114 is configured to classify text based on associated date and/or time, which may be usable to build a timeline and/or establish chronology of events.

The similarity analysis module 116 may perform various functions in various use cases. For instance, the similarity analysis module 116 may automatically detect duplicative requirements (e.g., in the case of MBSE), regulations/standards/policies, procedures, facts or evidence (e.g., in the case of litigation), and/or other concepts.

The topic analysis module 118 may perform various functions in various use cases. For instance, in the case of MBSE, the topic analysis module 118 may be configured to extract information and/or aspects from the text data 102 that are indicative of requirements for a system (e.g., functions, operational activities/characteristics, output characteristics, structural specifications/constraints/characteristics, etc.). As another example, in the case of litigation, the topic analysis module 118 may be configured to extract words, phrases, dates, etc. that are relevant to a case or controversy (e.g., relevant to one or more claims, defenses, and/or issues of a legal dispute).

As an illustrative, non-limiting MBSE example, the text data 102 may comprise a corpus of documents that includes various document types indicating requirements for a system. The text data 102 may be provided as input to the NLP layer 106, where the topic analysis module 118 analyzes the text data to determine portions of text from the text data 102 that are associated with system requirements. Output and/or intermediate representations generated by the topic analysis module 118 (and/or the text data 102 itself) may be processed by the syntax and verb usage module 112 to extract specific requirements from the text data 102 (e.g., from portions of the text data indicated as likely including requirements by the topic analysis module 118). Output and/or intermediate representations of the syntax and verb usage module 112 (and/or the topic analysis module 118, and/or the text data 102 itself) may be further processed by the categorization module 114 (e.g., to categorize the extracted requirements) and/or the similarity analysis module 116 (e.g., to flag duplicate requirements).

As an illustrative, non-limiting litigation example, the text data 102 may comprise a corpus of documents provided by a litigant pursuant to a discovery request (or a corpus of documents associated with an entity receiving a discovery request). The text data 102 may be provided as input to the NLP layer 106, where the topic analysis module 118 analyzes the text data to determine portions of text from the text data 102 that are potentially relevant to a litigation issue (or to build a timeline of events associated with the litigation issue). Output and/or intermediate representations generated by the topic analysis module 118 (and/or the text data 102 itself) may be processed by the syntax and verb usage module 112 to extract specific evidence from the text data 102 (e.g., from portions of the text data 102 indicated as likely including evidence by the topic analysis module 118). Output and/or intermediate representations of the syntax and verb usage module 112 (and/or the topic analysis module 118, and/or the text data 102 itself) may be further processed by the categorization module 114 (e.g., to categorize the extracted evidence) and/or the similarity analysis module 116 (e.g., to flag duplicative evidence).

FIG. 1 depicts various example formats of the output 120, including summary/report 122, annotation(s) 124, and prompt(s) 126 (the ellipsis of the output 120 indicates that the output 120 may comprise additional or alternative forms). For instance, a summary/report 122, annotation(s) 124, and/or prompt(s) 126 may be based on or indicate aspects of the mapping 160 or the relevant section(s) 170 obtained by processing the input text data 102 via the NLP layer 106 and/or fusion layer 108 of the text analysis system. A summary/report 122 may comprise a collection and/or summarization of portions of the text data 102 determined by the text analysis system 104 to be relevant. For instance, in an MBSE example, a summary/report 122 may detail particular system requirements extracted from the text data 102, while potentially omitting duplicative representations of requirements that are duplicated throughout the text data 102 (such requirements may be flagged in the report as duplicated within the text data). The detailing of the system requirements in the summary/report 122 may categorize the system requirements in various ways (e.g., qualitative vs quantitative requirements, system functions, dimensional constraints, computational constraints, etc.). For instance, the system requirements may be categorized based on groups/entities responsible for satisfaction of the requirements. In some instances, the summary/report 122 may provide links and/or otherwise provide ready access to excerpts/portions of the text data 102 that underlie the contents of the summary/report 122. In some instances, the summary/report 122 distinguishes between hard requirements (e.g., the system "shall") and soft requirements (e.g., the system "should").

As another example related to litigation, a summary/report may detail particular evidence extracted from text data 102 (e.g., in the form of an event timeline, in some instances), while potentially omitting duplicative representations of evidence that are duplicated throughout the text data 102 (such evidence may be flagged in the report as duplicated within the text data). The detailing of the evidence in the summary/report 122 may categorize the evidence in various ways (e.g., based upon which claim, defense, or issue the evidence is relevant to). In some instances, the summary/report 122 may provide links and/or otherwise provide ready access to excerpts/portions of the text data 102 that underlie the contents of the summary/report 122.

Output 120 implemented in the form of annotation(s) 124 may comprise annotations (e.g., highlighting, labels, comments, etc.) of the text data 102 based upon output of the NLP layer 106 and/or the fusion layer 108. For instance, portions of text within the text data 102 determined to be relevant (e.g., based upon inclusion of system requirements in MBSE cases or evidence in litigation cases) may be highlighted and/or annotated, allowing a user to analyze the text data 102 with analysis of the text analysis system 104 integrated into the text data 102.

Prompt(s) 126 may be presented to users in conjunction with other output indicating results provided by the text analysis system 104 (e.g., in conjunction with summary/report 122 and/or annotation(s) 124) to enable users to accept, modify, and/or reject the results provided by the text analysis system 104. For instance, a user may provide user input 130 based upon the prompt(s) 126 to indicate that structured components from the text data 102 were improperly interpreted, summarized, mapped, or determined to be relevant by the text analysis system 104 (e.g., in an MB SE example), or that evidence was improperly interpreted as relevant to a claim or defense by the text analysis system 104 (e.g., in a litigation example). Such user input 130 modifying output 120 provided by the text analysis system 104 may be utilized to further train/tune one or more of the AI modules (e.g., modules of the NLP layer 106, the fusion layer 108, and/or the output module 110) associated with the text analysis system 104 (as indicated in FIG. 1 by the arrow extending from the user input 130 to the text analysis system 104). In this regard, a text analysis system 104 may adapt to user preferences over time.

FIGS. 2, 3, and 4 illustrate example conceptual representations of output 120 generated by a text analysis system 104. One will appreciate that the particular format and the specific content shown in the examples of FIGS. 2, 3, and 4 are illustrative only and are not limiting of the principles described herein and that variations on the same are within the scope of the present disclosure.

FIG. 2 depicts output 200 showing aspects of a mapping of structured components from one document (i.e., "Document 2" in the example of FIG. 2) to structured components of another document (i.e., "Document 1" in the example of FIG. 2, which may be regarded as a set of reference text). The output 200 of FIG. 2 has various columns, including "Document 1 Component Name", "Document 1 Component Description", "Confidence Level", "Normalized Score", "Document 2 Component Name", "Document 2 Component Description", and "Reject?".

In the example of FIG. 2, "Document 1 Component Name" indicates names for structured components extracted from Document 1 (e.g., a set of reference text). Each entry in this column corresponds to a different structured component extracted from Document 1. "Document 1 Component Description" describes the corresponding structured component extracted from Document 1 (e.g., within the same row), which may be based on the text of Document 1 associated with the extracted structured component.

In the example of FIG. 2, "Confidence Level" shows the degree of confidence the text analysis system 104 has in the mapping or correlation results. For instance, if the Confidence Level for the corresponding structured component (e.g., within the same row) is "High", then the text analysis system 104 is confident that the results with high normalized scores are a potential correlation (e.g., potentially accurate mappings of structured components from Document 2 to structured components of Document 1). If the Confidence Level for the corresponding structured component (e.g., within the same row) is "Low," then the text analysis system is not confident that the results with high normalized scores are a potential correlation (e.g., accurate mappings of structured components from Document 2 to structured components of Document 1). One will appreciate that quantitative or other representations of confidence level are within the scope of the present disclosure.

In the example of FIG. 2, "Normalized Score" represents a normalization of raw scores indicating the confidence level of the text analysis system 104 in its mapping/correlation results. In the instant example, the highest correlation score (for mappings of structured components of Document 2 to a particular structured component of Document 1) is given a normalized score of 1, and the lowest correlation score is given a normalized score of 0, with intermediate correlation scores being given values in between 0 and 1.

In the example of FIG. 2, "Document 2 Component Name" indicates names for structured components extracted from Document 2 (e.g., a first or additional set of text). Each entry in this column corresponds to a different structured component extracted from Document 2. "Document 2 Component Description" describes the corresponding structured component extracted from Document 2 (e.g., within the same row), which may be based on the text of Document 2 associated with the extracted structured component.

The output 200 of FIG. 2 shows multiple different structured components extracted from Document 2 and mapped to the "SyRS-2.0" component of Document 1. The output 200 of FIG. 2 also shows multiple different structured components extracted from Document 2 and mapped to the "SyRS-5.0" component of Document 1. A user may review the output 200 to readily determine whether structured components exist in Document 2 that are correlated or accurately mapped to structured components of Document 1. In the example of systems engineering, Document 1 may comprise a requirements document, and Document 2 may comprise a vendor specification for a system that will attempt to satisfy the requirements of the requirements document. Although FIG. 2 depicts a single document being mapped to Document 1, any quantity of documents may be mapped to a single document. Thus, in some examples, users may assess the output of a text analysis system 104 to determine whether one or more vendor specifications are likely to comply with provided requirements.

In the example of FIG. 2, "Reject?" provides prompts or selectable buttons labeled "Reject" that can enable users to reject mappings provided by the text analysis system 104. For instance, the text analysis system 104 may indicate, with high confidence, that a specific structured component from Document 2 is correlated or mapped to a specific structured component of Document 1. A user may reject this finding by providing user input (e.g., selecting the "Reject" button in the same row as the specific mapping result), and the user input may be utilized to further train components of the text analysis system 104 (e.g., to train modules of the NLP layer 106).

FIG. 3 depicts output 300 showing simplified or summarized aspects of the mapping of structured components from Document 2 to structured components of Document 1. The output 300 of FIG. 3 has columns indicating "Document 1 Component Name", "Document 1 Component Description" and "Confidence Level". Rather than including a "Normalized Score" column, output 300 includes separate columns indicating the quantity of structured components of Document 2 that achieve normalized mapping scores or normalized correlation scores that are within particular ranges. In the example of FIG. 3, output 300 includes a "High Score Count" column, a "Moderate Score Count" column, and a "Low Score Count" column. The "High Score Count" column may indicate the quantity of structured components from Document 2 that map to the corresponding structured component of Document 1 (e.g., within the same row) with a high normalized score (e.g., a normalized score equal to or greater than 0.75). The "Moderate Score Count" column may indicate the quantity of structured components from Document 2 that map to the corresponding structured component of Document 1 (e.g., within the same row) with a moderate normalized score (e.g., a normalized score within a range of 0.25 to 0.75). The "Low Score Count" column may indicate the quantity of structured components from Document 2 that map to the corresponding structured component of Document 1 (e.g., within the same row) with a low normalized score (e.g., a normalized score equal to or less than 0.25).

FIG. 4 depicts output 400 that includes a representation of input text 402 processed by a text analysis system 104. The input text 402 includes different sections, including "Introduction", "Diagnostics and Medical Imaging", "Drug Discovery and Development", and Clinical Decision Support Systems". Each section includes structured components in the form of sentences. As described hereinabove with reference to FIG. 1, topic analysis may be performed on the structured components of the different sections, and the topics may be compared to the topics or topic sets associated with the different sections of the input text 402 to determine relevant sections for the different structured components. FIG. 4 depicts a particular structured component 404 for which a particular topic is determined via topic analysis, and the particular topic is compared to the topics or topic sets associated with the sections of the input text 402 to determine a relevant section. In the example, of FIG. 4, the particular structured component 404 is bolded or otherwise emphasized, which may indicate that the relevant section for the particular structured component 404 is different from the section that the particular structured component 404 is organized under in the input text 402. FIG. 4 also depicts output 406, which indicates the relevant section for the particular structured component 404 (i.e., "Diagnostics and Medical Imaging") and indicates a confidence level associated with the indication of the relevant section (i.e., "High"). The output 406 of FIG. 4 also includes a "Reject" button, which may allow users to reject the relevant section assigned to the particular structured component 404 by the text analysis system 104 and/or the confidence level associated therewith. In some instances, the output 400 may include selectable functionality (e.g., additional prompts) that can facilitate automatic migration of the particular structured component 404 to the relevant section when selected.

As indicated hereinabove, various training techniques may be employed to train components of a text analysis system 104. For instance, particular NLP or other modules of the NLP layer 106, fusion layer 108, and/or output module 110 may comprise pre-trained modules trained in a supervised manner, unsupervised manner, or some combination thereof. Individual modules may be trained/tuned for particular use cases, domains, etc. For example, one or more of the modules of the NLP layer 106 may be individually trained utilizing one or more tagged or tokenized sets/corpora of text data (which may be domain-specific), and the modules may be trained in combination with one another (e.g., via the fusion layer 108) utilizing one or more sets of ground truth data (which may be domain-specific). The ground truth data may correspond at least in part to the one or more of the formats of the output 120 described hereinabove (e.g., summary/report 122, annotation(s) 124, prompt(s) 126). Such ground truth data may be provided by a human in the training loop and/or may advantageously exist in various enterprises that currently perform analysis of collections of text data under conventional methods (e.g., entities associated with MB SE, litigation, and/or other use cases).

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
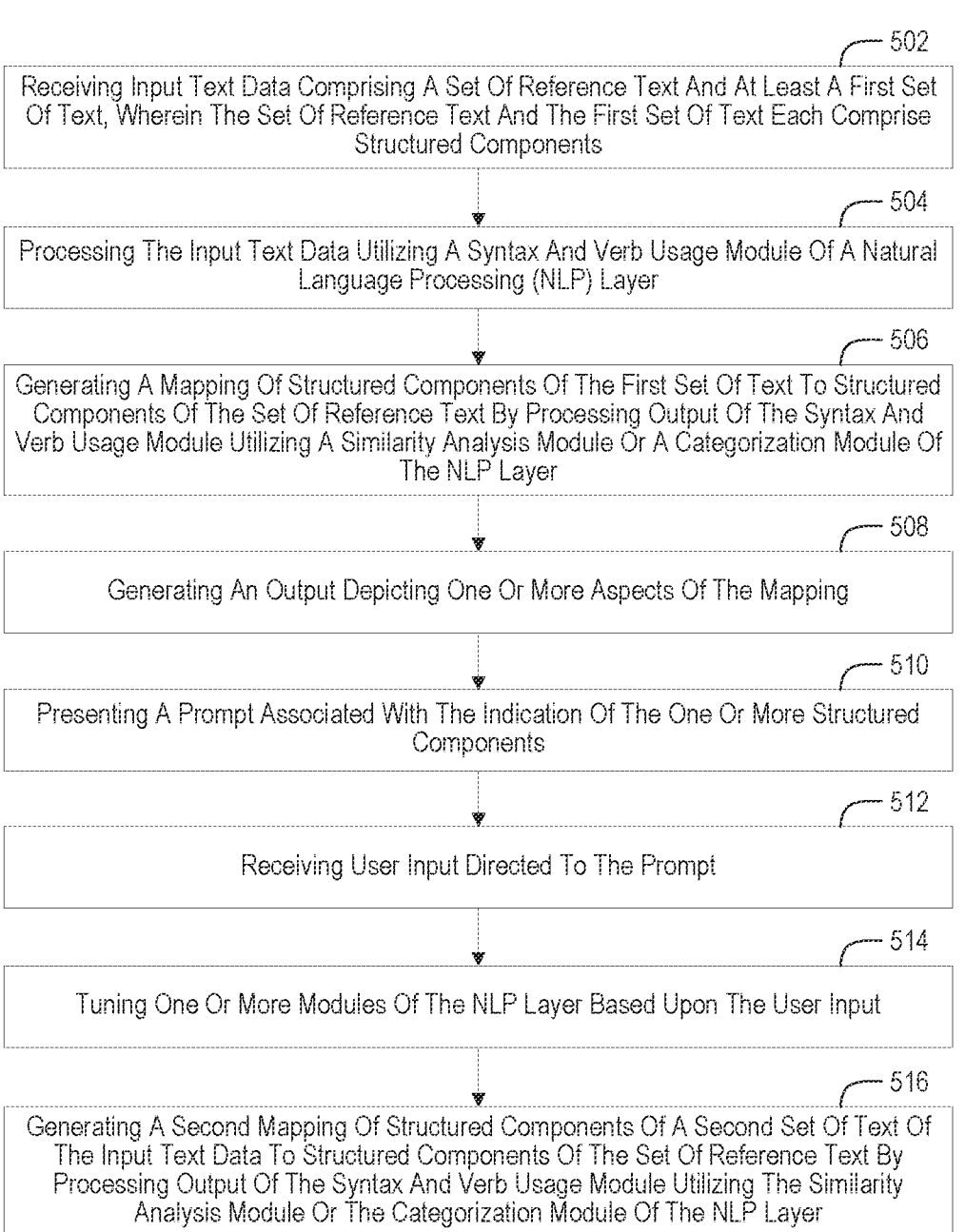
FIGS. 5 and 6 illustrate example flow diagrams depicting acts associated with analyzing text utilizing a text analysis system, in accordance with implementations of the present disclosure.
Figure 6:
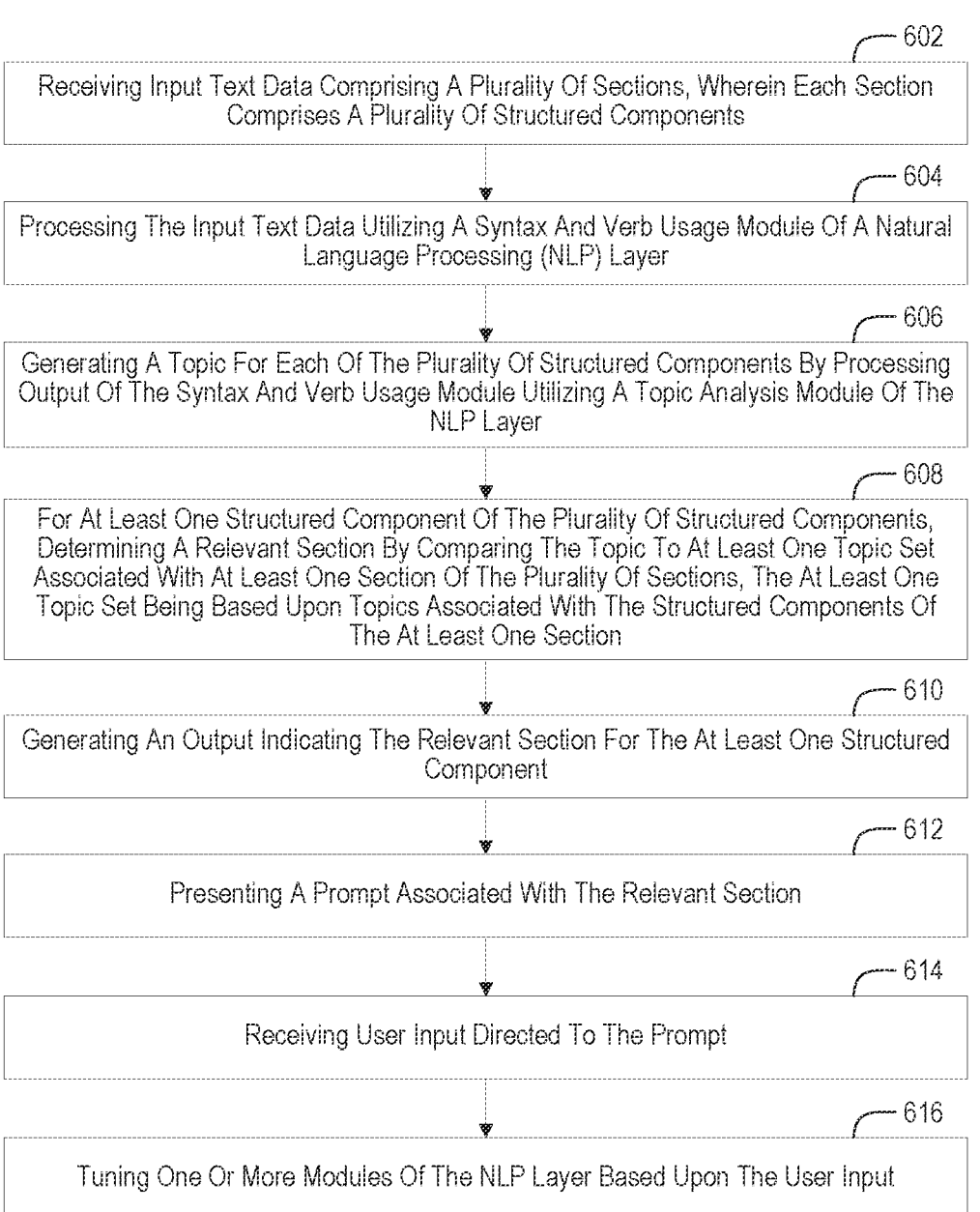
Figure 7:
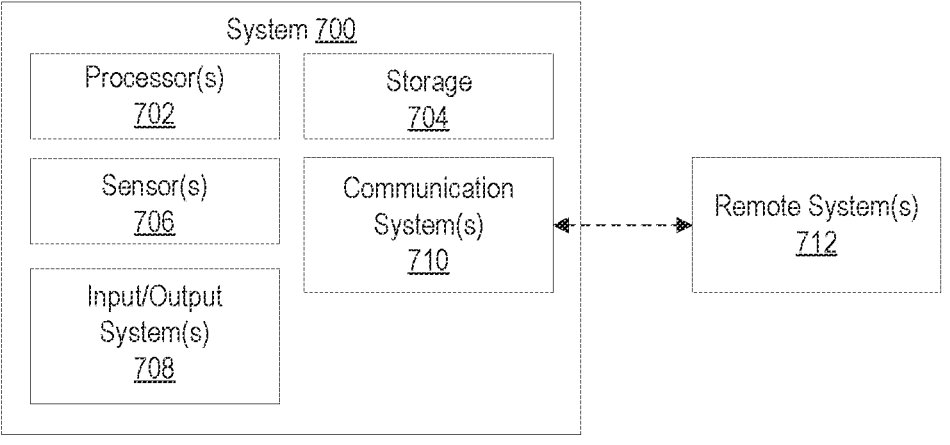
FIG. 7 illustrates an example system that may comprise or implement one or more disclosed embodiments.

FIGS. 5 and 6 illustrate example flow diagrams 500 and 600, respectively, depicting acts associated with analyzing text utilizing a text analysis system.

Act 502 of flow diagram 500 of FIG. 5 includes receiving input text data comprising a set of reference text and at least a first set of text, wherein the set of reference text and the first set of text each comprise structured components. In some instances, the structured components of the set of reference text and the first set of text comprise sentences. In some implementations, the set of reference text comprises one or more reference documents, and the first set of text comprises one or more first documents. In some instances, the structured components of the set of reference text indicate one or more requirements. In some implementations, the input text data comprises output of one or more pre-processing modules.

Act 504 of flow diagram 500 includes processing the input text data utilizing a syntax and verb usage module of a natural language processing (NLP) layer.

Act 506 of flow diagram 500 includes generating a mapping of structured components of the first set of text to structured components of the set of reference text by processing output of the syntax and verb usage module utilizing a similarity analysis module or a categorization module of the NLP layer. In some examples, the mapping comprises a mapping of structured components of the one or more first documents to the one or more requirements of the set of reference text. In some instances, generating the mapping utilizes the similarity analysis module. In some implementations, generating the mapping utilizes the categorization module. In some examples, the categorization module utilizes embeddings generated based on the input text data to generate the mapping. In some instances, the output of the syntax and verb usage module is further processed by a topic analysis module prior to generating the mapping.

Act 508 of flow diagram 500 includes generating an output depicting one or more aspects of the mapping. In some implementations, the output depicting the one or more aspects of the mapping depicts, for at least one structured component of the set of reference text, an indication of one or more structured components of the first set of text that are mapped to the at least one structured component. In some examples, the indication of the one or more structured components indicates a quantity or a confidence level associated with the one or more structured components. In some instances, the confidence level comprises a normalized confidence score. In some implementations, the indication of the one or more structured components indicates text content or a location associated with the one or more structured components.

Act 510 of flow diagram 500 includes presenting a prompt associated with the indication of the one or more structured components.

Act 512 of flow diagram 500 includes receiving user input directed to the prompt.

Act 514 of flow diagram 500 includes tuning one or more modules of the NLP layer based upon the user input.

Act 516 of flow diagram 500 includes generating a second mapping of structured components of a second set of text of the input text data to structured components of the set of reference text by processing output of the syntax and verb usage module utilizing the similarity analysis module or the categorization module of the NLP layer.

Act 602 of flow diagram 600 of FIG. 6 includes receiving input text data comprising a plurality of sections, wherein each section comprises a plurality of structured components.

Act 604 of flow diagram 600 includes processing the input text data utilizing a syntax and verb usage module of a natural language processing (NLP) layer.

Act 606 of flow diagram 600 includes generating a topic for each of the plurality of structured components by processing output of the syntax and verb usage module utilizing a topic analysis module of the NLP layer.

Act 608 of flow diagram 600 includes, for at least one structured component of the plurality of structured components, determining a relevant section by comparing the topic to at least one topic set associated with at least one section of the plurality of sections, the at least one topic set being based upon topics associated with the structured components of the at least one section.

Act 610 of flow diagram 600 includes generating an output indicating the relevant section for the at least one structured component. In some examples, act 610 is performed in response to determining that the relevant section for the at least one structured component is different from the section of the plurality of sections of which the at least one structured component is a part in the input text data.

Act 612 of flow diagram 600 includes presenting a prompt associated with the relevant section.

Act 614 of flow diagram 600 includes receiving user input directed to the prompt.

Act 616 of flow diagram 600 includes tuning one or more modules of the NLP layer based upon the user input.

Additional Details Related to Implementing the Disclosed Embodiments

FIG. 3 illustrates example components of a system 700 that may comprise or implement aspects of one or more disclosed embodiments. For example, FIG. 3 illustrates an implementation in which the system 700 includes processor(s) 702, storage 704, sensor(s) 706, I/0 system(s) 708, and communication system(s) 710. Although FIG. 3 illustrates a system 700 as including particular components, one will appreciate, in view of the present disclosure, that a system 700 may comprise any number of additional or alternative components.

The processor(s) 702 may comprise one or more sets of electronic circuitries that include any number of logic units, registers, and/or control units to facilitate the execution of computer-readable instructions (e.g., instructions that form a computer program). Such computer-readable instructions may be stored within storage 704. The storage 704 may comprise physical system memory and may be volatile, non-volatile, or some combination thereof. Furthermore, storage 704 may comprise local storage, remote storage (e.g., accessible via communication system(s) 710 or otherwise), or some combination thereof. Additional details related to processors (e.g., processor(s) 702) and computer storage media (e.g., storage 704) will be provided hereinafter.

As will be described in more detail, the processor(s) 702 may be configured to execute instructions stored within storage 704 to perform certain actions. In some instances, the actions may rely at least in part on communication system(s) 710 for receiving data from remote system(s) 712, which may include, for example, separate systems or computing devices, sensors, and/or others. The communications system(s) 710 may comprise any combination of software or hardware components that are operable to facilitate communication between on-system components/devices and/or with off-system components/devices. For example, the communications system(s) 710 may comprise ports, buses, or other physical connection apparatuses for communicating with other devices/components. Additionally, or alternatively, the communications system(s) 710 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 3 illustrates that a system 700 may comprise or be in communication with sensor(s) 706. Sensor(s) 706 may comprise any device for capturing or measuring data representative of perceivable phenomenon. By way of non-limiting example, the sensor(s) 706 may comprise one or more image sensors, microphones, thermometers, barometers, magnetometers, accelerometers, gyroscopes, and/or others.

Furthermore, FIG. 3 illustrates that a system 700 may comprise or be in communication with I/O system(s) 708. I/O system(s) 708 may include any type of input or output device such as, by way of non-limiting example, a display, a touch screen, a mouse, a keyboard, a controller, and/or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for facilitating text analysis, comprising:
   one or more processors; and
   one or more hardware storage devices that store instructions that are executable by the one or more processors to configure the system to:
   process input text data utilizing a syntax and verb usage module of a natural language processing (NLP) layer, wherein the input text data comprises a set of reference text and at least a first set of text, wherein the set of reference text and the first set of text each comprise structured components;

utilize output of the syntax and verb usage module as input to a categorization module of the NLP layer, wherein the categorization module is configured to map structured components of the first set of text to structured components of the set of reference text by generating embeddings based on the output of the syntax and verb usage module and categorizing the output of the syntax and verb usage module relative to predefined groupings determined via the categorization module based on the set of reference text;

utilize the output of the syntax and verb usage module as input to a similarity analysis module of the NLP layer, wherein the similarity analysis module is configured to map structured components of the first set of text to structured components of the set of reference text by comparing, in an embedding space, (i) embeddings generated via the similarity analysis module based on the output of the syntax and verb usage module and (ii) embeddings generated via the similarity analysis module based on the set of reference text;

fuse output of the categorization module and the similarity analysis module to generate a mapping of structured components of the first set of text to structured components of the set of reference text;

generate and present, on a user interface, (i) an output depicting one or more aspects of the mapping and (ii) a prompt, wherein the output depicts, for at least one structured component of the set of reference text, an indication of one or more structured components of the first set of text that are mapped to the at least one structured component, and wherein the prompt is associated in the user interface with the indication of the one or more structured components of the first set of text;

receive user input directed to the prompt, wherein the user input indicates rejection of the mapping of the one or more structured components of the first set of text to the at least one structured component of the set of reference text; and tune one or more modules of the NLP layer based on the user input.

2. The system of claim 1, wherein the structured components of the set of reference text and the first set of text comprise sentences.

3. The system of claim 1, wherein the set of reference text comprises one or more reference documents, and wherein the first set of text comprises one or more first documents.

4. The system of claim 3, wherein the structured components of the set of reference text indicate one or more requirements, and wherein the mapping comprises a mapping of structured components of the one or more first documents to the one or more requirements of the set of reference text.

5. The system of claim 1, wherein the input text data comprises output of one or more preprocessing modules.

6. The system of claim 1, wherein the output of the syntax and verb usage module is further processed by a topic analysis module prior to generating the mapping.

7. The system of claim 1, wherein the indication of the one or more structured components indicates a quantity or a confidence level associated with the one or more structured components.

8. The system of claim 7, wherein the confidence level comprises a normalized confidence score.

9. The system of claim 1, wherein the indication of the one or more structured components indicates text content or a location associated with the one or more structured components.

10. The system of claim 1, wherein the input text data further comprises a second set of text that comprises structured components, and wherein the instructions are executable by the one or more processors to further configure the system to:

generate a second mapping of structured components of the second set of text to structured components of the set of reference text by processing output of the syntax and verb usage module utilizing the similarity analysis module or the categorization module of the NLP layer.

11. The system of claim 10, wherein the output depicting one or more aspects of the mapping further depicts one or more aspects of the second mapping.

12. A method for facilitating text analysis, comprising:

processing input text data utilizing a syntax and verb usage module of a natural language processing (NLP) layer, wherein the input text data comprises a set of reference text and at least a first set of text, wherein the set of reference text and the first set of text each comprise structured components;

utilizing output of the syntax and verb usage module as input to a categorization module of the NLP layer, wherein the categorization module is configured to map structured components of the first set of text to structured components of the set of reference text by generating embeddings based on the output of the syntax and verb usage module and categorizing the output of the syntax and verb usage module relative to predefined groupings determined via the categorization module based on the set of reference text;

utilizing the output of the syntax and verb usage module as input to a similarity analysis module of the NLP layer, wherein the similarity analysis module is configured to map structured components of the first set of text to structured components of the set of reference text by comparing, in an embedding space, (i) embeddings generated via the similarity analysis module based on the output of the syntax and verb usage module and (ii) embeddings generated via the similarity analysis module based on the set of reference text;

fusing output of the categorization module and the similarity analysis module to generate a mapping of structured components of the first set of text to structured components of the set of reference text;

generating and presenting, on a user interface, (i) an output depicting one or more aspects of the mapping and (ii) a prompt, wherein the output depicts, for at least one structured component of the set of reference text, an indication of one or more structured components of the first set of text that are mapped to the at least one structured component, and wherein the prompt is associated in the user interface with the indication of the one or more structured components of the first set of text;

receiving user input directed to the prompt, wherein the user input indicates rejection of the mapping of the one or more structured components of the first set of text to the at least one structured component of the set of reference text; and tuning one or more modules of the NLP layer based on the user input.

13. The method of claim 12, wherein the structured components of the set of reference text and the first set of text comprise sentences.

14. The method of claim 12, wherein the set of reference text comprises one or more reference documents, and wherein the first set of text comprises one or more first documents.

15. The method of claim 14, wherein the structured components of the set of reference text indicate one or more requirements, and wherein the mapping comprises a mapping of structured components of the one or more first documents to the one or more requirements of the set of reference text.

16. The method of claim 12, wherein the input text data comprises output of one or more preprocessing modules.

17. The method of claim 12, wherein the output of the syntax and verb usage module is further processed by a topic analysis module prior to generating the mapping.

18. The method of claim 12, wherein the indication of the one or more structured components indicates a quantity or a confidence level associated with the one or more structured components.

19. The method of claim 12, wherein the indication of the one or more structured components indicates text content or a location associated with the one or more structured components.

20. One or more hardware storage devices that store instructions that are executable by one or more processors of a system to configure the system to:

process input text data utilizing a syntax and verb usage module of a natural language processing (NLP) layer, wherein the input text data comprises a set of reference text and at least a first set of text, wherein the set of reference text and the first set of text each comprise structured components;

utilize output of the syntax and verb usage module as input to a categorization module of the NLP layer, wherein the categorization module is configured to map structured components of the first set of text to structured components of the set of reference text by generating embeddings based on the output of the syntax and verb usage module and categorizing the output of the syntax and verb usage module relative to predefined groupings determined via the categorization module based on the set of reference text;

utilize the output of the syntax and verb usage module as input to a similarity analysis module of the NLP layer, wherein the similarity analysis module is configured to map structured components of the first set of text to structured components of the set of reference text by comparing, in an embedding space, (i) embeddings generated via the similarity analysis module based on the output of the syntax and verb usage module and (ii) embeddings generated via the similarity analysis module based on the set of reference text;

fuse output of the categorization module and the similarity analysis module to generate a mapping of structured components of the first set of text to structured components of the set of reference text;

generate and present, on a user interface, (i) an output depicting one or more aspects of the mapping and (ii) a prompt, wherein the output depicts, for at least one structured component of the set of reference text, an indication of one or more structured components of the first set of text that are mapped to the at least one structured component, and wherein the prompt is associated in the user interface with the indication of the one or more structured components of the first set of text;

receive user input directed to the prompt, wherein the user input indicates rejection of the mapping of the one or more structured components of the first set of text to the at least one structured component of the set of reference text; and tune one or more modules of the NLP layer based on the user input.

* * * * *